United States Patent [19]

Vogel

[11] 3,839,737

[45] Oct. 1, 1974

[54] TRANSDUCER POSITIONING DEVICE

[75] Inventor: Charles A. Vogel, Sunnyvale, Calif.

[73] Assignee: Newell Industries Inc., Sunnyvale, Calif.

[22] Filed: Dec. 7, 1972

[21] Appl. No.: 312,878

[52] U.S. Cl. ............................................. 360/106
[51] Int. Cl.... G11b 5/56, G11b 21/12, G11b 21/24
[58] Field of Search ......................... 274/4 A, 11 A; 179/100.2 CA

[56] References Cited
UNITED STATES PATENTS

| | | | |
|---|---|---|---|
| 3,541,273 | 11/1970 | Lyon et al. | 274/4 A |
| 3,672,685 | 6/1972 | Tolar | 274/4 A |

Primary Examiner—Harry N. Haroian
Attorney, Agent, or Firm—Flehr, Hohbach, Test, Albritton & Herbert

[57] ABSTRACT

A transducer positioning device for accurately moving a transducer to each of a plurality of discrete transducing positions on a record medium includes an elongate transducer support element for carrying a transducer to move from one of the positions to another together with brake means operable to selectively engage and release the support element or post to respectively grip or release the support element. Cam means having a plurality of discrete steps is disposed to cooperate with a portion of the support post so as to position it to one of a plurality of positions. A spring urges the support post toward the cam steps so as to position the support post (and the transducer which it carries) relative to the discrete transducing positions required. While the brake inhibits movement of the support post toward the cam means, a drive means is provided for moving the cam steps in a direction moving one of them out from under the bottom of the support post to form a gap therebetween. Thus, by selectively releasing the brake at a particular moment, the spring biasing means will drive the support post toward the step disposed in spaced relation therebeneath.

8 Claims, 9 Drawing Figures

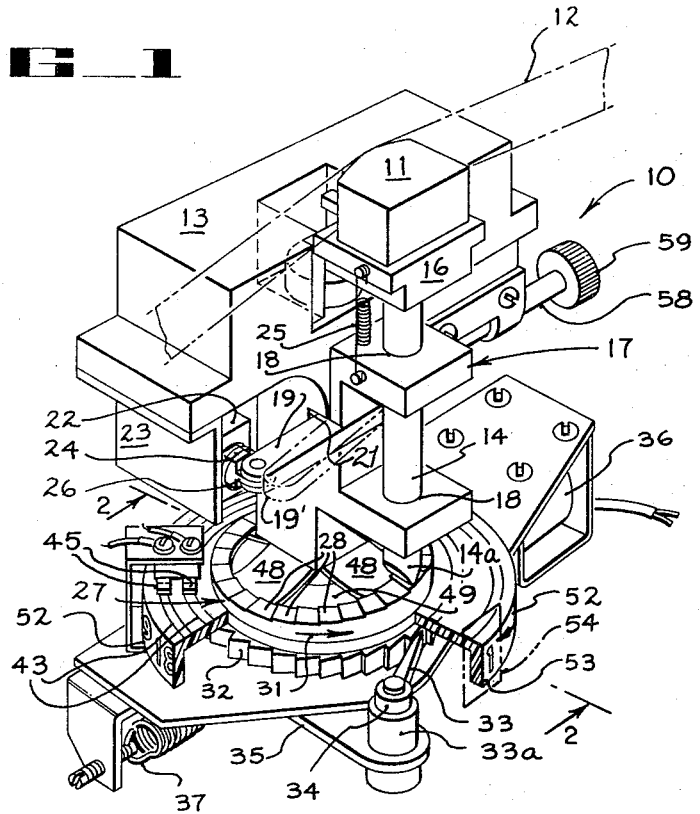
FIG_1
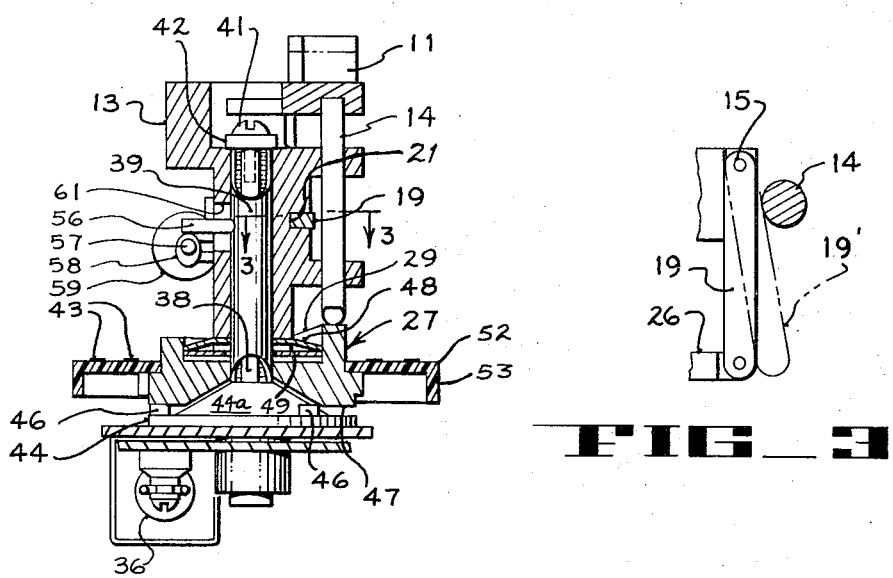
FIG_2
FIG_3

TRANSDUCER POSITIONING DEVICE

BACKGROUND OF THE INVENTION

This invention pertains to a transducer positioning device for accurately moving a transducer to each of a plurality of discrete transducing positions defined on a record medium and is particularly useful in positioning a magnetic transducing head laterally of a number of tracks disposed to extend along the length of a magnetic recording medium, such as a pliable tape.

In accomplishing the positioning of a magnetic transducer accurately to each of a number of elongate record tracks on a magnetic tape or other record medium, locating the transducer precisely with respect to the record paths to be transduced becomes more and more critical in relation to the number of tracks per inch required to be recorded upon the medium. In the case of magnetic record tape used in video recording, the expense involved in the purchase of video tape rolls necessitates that a great number of tracks per inch be provided. In one system, alternate tracks are played in opposite directions to provide minimum tape expense in the production of a relatively long video program.

Obviously, the closer the spacing becomes between adjacent record tracks, the more accurate the positioning of a transducer must be in order to be precisely located relative to a desired track. As any head positioning device is used over a long period of time, its accuracy typically will be reduced due to wearing of the various parts.

Accordingly, it is desirable to provide a transducer positioning device having extreme accuracy in locating a recording transducer and one whose accuracy will remain substantially unaffected by extended use.

SUMMARY OF THE INVENTION AND OBJECTS

In general, in a transducer positioning device for accurately moving a transducer to each of a plurality of discrete transducing positions on a record medium, there is provided a transducer support element for carrying the transducer so as to move it from one of the transducing positions to another. Brake means operable to selectively engage and release the support element serve to grip or free the support element respectively while a cam means having a plurality of discrete steps disposed to cooperate with a portion of the support element serves to position the support element. Biasing means such as a spring urges the support element toward the cam steps to position the support element and transducer relative to the transducing positions of the record medium. Means for moving the cam steps in a direction leading them out from under the support element serves to form a gap therebeneath while the brake inhibits movement of the support element toward the cam means. Upon releasing the brake, the biasing means moves the support element toward the step to translate the transducer to a related degree.

It is a general object of the present invention to provide an improved transducer positioning device having increased accuracy over a prolonged period of time and wherein the spacing between tracks can be defined at a minimum.

It is another object of the present invention to provide a transducer positioning device having means for making a fine adjustment of the registration of a transducer with a given track.

The foregoing and other objects of the invention will become more readily evident from the following detailed description of a preferred embodiment.

BRIEF DESCRIPTION OF THE DRAWINGS

FIG. 1 shows a perspective diagrammatic view partially broken away for clarity of a transducer positioning device according to the invention;

FIG. 2 shows an end elevation section view taken along the line 2—2 of FIG. 1;

FIG. 3 shows an enlarged diagrammatic plan view of a detail portion of FIG. 2 taken along the line 3—3 thereof;

DETAILED DESCRIPTION OF A PREFERRED EMBODIMENT

Figure 7:
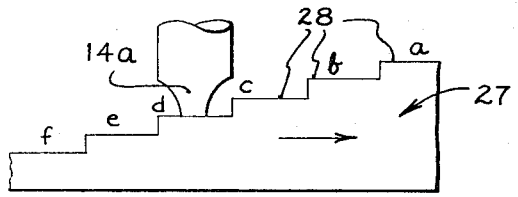
FIGS. 7, 8 and 9 show diagrammatically three steps of operation of a cam follower portion of the device shown in FIG. 1.

A transducer positioning device 10 serves to move a magnetic transducer 11 laterally from one record track or path recorded along the moving magnetic tape 12 (or other magnetic record medium) to another so as to transduce information signals relative to the track associated with the transducer 11.

A mounting block 13 forms a frame member to be rigidly secured to a tape transport machine for moving the magnetic tape 12 between supply and take-up rolls (not shown).

A transducer support post 14 serves to carry transducer 11 on a head mounting plate 16 secured to the upper end of post 14 and movable therewith. Mounting block 13 includes as a portion integral thereto the bifurcated U-shaped bracket 17 formed with aligned openings 18 in the sides of the U.

As thus arranged, bracket 17 serves as a guide for post 14 disposed within openings 18. Clearance is maintained around post 14 within openings 18 sufficient to readily permit axial movement of post 14 therethrough. Accordingly, it is to be understood that, unless restrained, post 14 may fall freely through openings 18. A spring 25, however, coupled between plate 16 and bracket 17 applies a downward bias force serving to quickly draw head 11 laterally of tape 12 whenever post 14 is released.

Brake means, however, serve to selectively press post 14 firmly against the sidewall of openings 18 so as to inhibit axial movement of post 14 at any time that the brake means is operated to press post 14 against the laterally outer sidewall of openings 18.

Thus, lever arm 19 is disposed in the slot 21 in mounting block 13 and pivoted from its righthand end, as viewed in FIG. 1, by pin 15 lying parallel to and just beyond the axis of post 14 whereby the maximum mechanical advantage will be achieved as will be described further below.

Means for selectively moving lever arm 19 between advanced and retracted positions for respectively gripping and releasing post 14 comprises the solenoid 22 mounted by suitable means to the side plate 23 depending downwardly from beneath mounting block 13 and the relatively strong helical spring 24 encircling the armature 26 of solenoid 22. The outer end of armature 26 is pivotally coupled to lever arm 19 for driving lever arm 19 to its advanced position (shown in phantom lines and identified as 19').

In the position shown by reference numeral 19', lever arm 19 is forced against the side of post 14 whereby post 14 will be restrained from moving either upwardly or downwardly by virtue of the binding friction between post 14 and the sidewall openings 18. Further, it will be evident that lever arm 19 is disposed midway between the two journal openings 18 which guide post 14 whereby post 14 is firmly registered with equal force against the right-hand sidewall of openings 18 at both the top and bottom of bracket 17. In this manner, transducer 11 will be firmly secured against vibration and other movement.

Cam means as now to be described having a plurality of discrete steps disposed to move in a predetermined path for engaging the lower end 14a of post 14 in cam-following relation comprises the annular face cam 27 formed with a number of individual discrete steps 28 of very slight displacement from one to the next. Cam 27 further includes a generally smooth head lifting camp portion 29 whereby post 14 can be returned upwardly once during each rotation of cam 27.

The lower end 14a of post 14 is formed as a cam follower in the sense that portion 14a when seated on one of the steps 28 serves to directly locate transducer 11 to a related position laterally of magnetic tape 12. Also, when follower portion 14a encounters cam portion 29 of face cam 27 (with lever 19 withdrawn from post 14), cam 29 will serve to lift transducer 11 upwardly to an initial track position.

Means for supporting cam 27 for rotation comprise the elongate support rod 38 disposed coaxially of support tube 39 which is, in turn, carried within mounting block 13 by means of a screw 41, an anti-friction washer 42 of suitable low friction, tough material such as a suitable plastic. Screw 41 passes downwardly into threaded relation with the upper end of rod 38. Rod 38 is coupled at its lower end to the conically shaped portion 44a of a base plate 44.

Base plate 44 includes a plurality of three upwardly extending anti-friction bearing buttons 46 of suitable material for engaging the smooth bottom surface 47 of cam member 27. Cam member 27 further includes a track-identifying skirt 42 formed with a downwardly depending flange portion 53 prepared with numbers adapted to register with and be viewed through a window 54 shown only in phantom lines herein for viewing the identification of the particular track to which transducer 11 is positioned.

Skirt 52 is prepared with track detecting commutator portions 43 of conductive material applied with printed circuit technique to the top surface of skirt 52. Brushes 45 ride in contact with portions 43a which, in various combinations, serve to identify the track associated with transducer 11.

Figure 5:
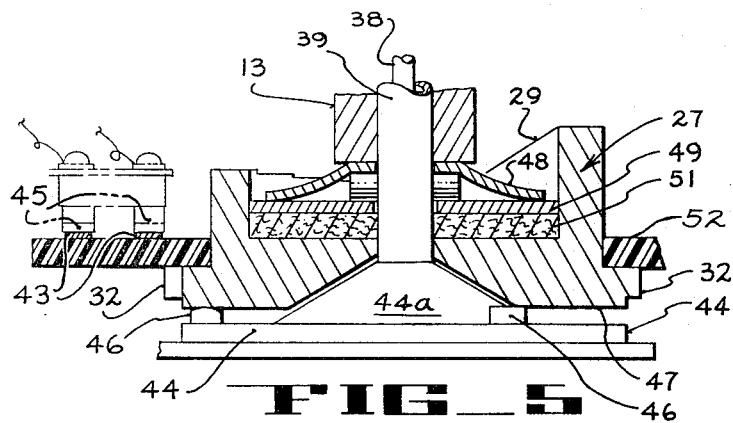
FIG. 5 shows an enlarged detail elevation section view of the bottom portion of FIG. 2
Figure 6:
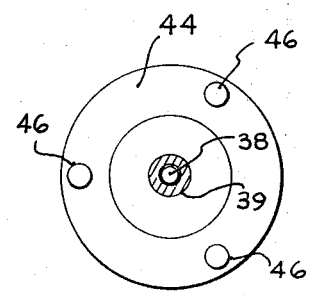
FIG. 6 shows a diagrammatic plan view detail of the base plate portion of FIG. 5.

The cross-shaped leaf spring member 48 (FIG. 5) formed with a central opening therethrough and disposed about the axis of support tube 39 urges cam member 27 firmly downwardly against buttons 46. Spring 48 is interposed between the lower end of block 13 and a washer 49 also carried about tube 39. Washer 49 serves to retain a felt washer 51 impregnated with a viscous damping material such as oil so as to apply a rotational drag to cam member 27 to prevent it from being inadvertently rotated except when positively driven.

Further, the clearance defined between rod 38 and tube 39 is also filled with a viscous damping fluid to apply a drag between the rotation of these two members as well.

Means for rotating cam member 27 in stepwise fashion so as to move it in the direction of arrow 31 comprises the ratchet teeth 32 formed about the periphery of cam member 27 and adapted to be engaged by a driving pawl 33.

Pawl 33 is formed with an annular mounting end 33a disposed about a pivot post 34 and is spring-urged toward teeth 32 so as to maintain firm engagement therewith. Post 34, in turn, is carried on the end of a bell crank 34 which can be moved between advanced and retracted positions by means of the solenoid 36 and spring 37 each of which are coupled to an opposite arm of bell crank 35.

Accordingly, by energizing solenoid 36, bell crank 35 can be rotated so as to drag pawl 33 across teeth 32. De-energizing solenoid 36 permits spring 37 to drive pawl 33 in the direction of arrow 31 so as to rotate cam member 27.

Finally, means for adjusting the relative position of the support member or post 14 with respect to a frame member such as the mounting block 13 so as to precisely align transducer element 11 with the center of its then associated track comprises the transversely extending follower pin 56 and the eccentric portion 58 of the rotatable adjusting rod 57. A knurled knob 59 carried on the end of rod 57 may be gripped and rotated for making the fine adjustment to the location of transducer 11.

Accordingly, by rotating rod 58, eccentric portion 58 will drive follower pin 56 upwardly and downwardly to a very slight degree with pin 56 protruding through opening 61 formed through the side of mounting block 13.

From the foregoing, it will be readily evident that pin 56 carries support tube 39 as well as support rod 38 which, in turn, supports cam member 27. In this way, cam member 27 can be raised or lowered to a very slight degree so as to adjust the location of transducer element 11 so as to compensate for different track positions where the tapes are recorded on machines other than the one used in conjunction with device 10.

Operation of the device described proceeds as follows.

In a typical application, such as the playing back of a pre-recorded program, magnetic record tape 12 will have been prepared with a large number of record tracks thereon located in side-by-side relation at very closely spaced intervals related to the displacement between steps 28. The tape is fed first in one direction. As the end of the roll is reached, the tape is reversed and fed in an opposite direction. Under these circumstances, it is highly desirable, if not critical, particularly where a video recording, for example, is being pursued to shift transducer element 11 from one track to another at that point in time when the tape is neither travelling forwardly nor backwardly so as to cause substantially no perceptible change in the quality of the reproduced signal transduced relative to the tape.

The transducer movement must be quite quick since the reversing of the tape must necessarily also be equally quick in order to preserve the uninterrupted quality of the picture being transduced.

Accordingly, at a suitable non-critical point in time relative to the feeding of tape from one roll to the other, for example, somewhat near the end of the feeding of the roll of tape, solenoid 36 may be activated and then deactivated so as to permit spring 37 to drive pawl 33 in a direction to advance cam member 27 one step thereby leaving a gap beneath the cam follower portion 14a of post 14. However, at this time, the strong spring 24 will be urging lever arm 19 outwardly into compressive engagement with post 14 thereby binding post 14 firmly against the side wall of openings 18. Thus, transducer 11 will be held in place by this brake means as described.

Subsequently, at the critical time when it is desired to quickly move transducer 11 from one track to another, solenoid 22 can be activated to withdraw lever arm 19 thereby permitting transducer 11 to fall under the urging of spring 25.

At that point, the lower end of follower portion 14a engages the next successive step 28 thereby transferring transducer element 11 to the next track position.

Figure 8:
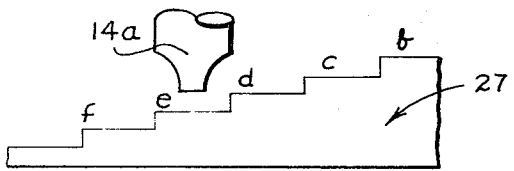
Figure 9:
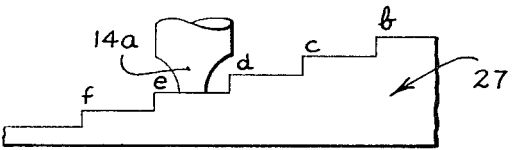
Figure 4:
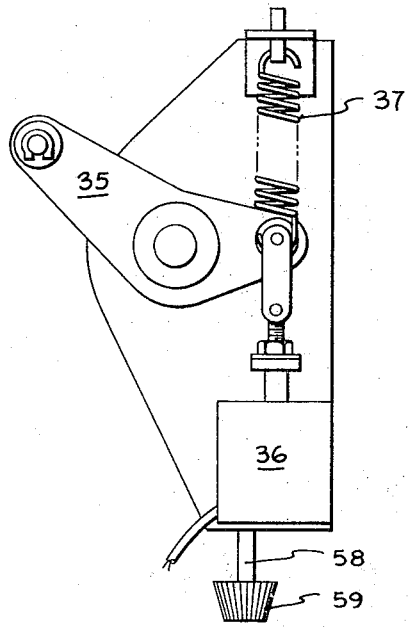
FIG. 4 shows a bottom plan view of FIG. 2 showing a detail thereof.

As shown in FIGS. 7, 8 and 9, this operation takes place in the steps shown. In FIG. 7, cam follower portion 14a of post 14 is riding on step d during the playing of tape in one direction. Near the end of the pass, the ratchet is operated to advance cam member 27 one step to the position shown in FIG. 8. The lower end of follower portion 14a remains in the position shown in FIG. 8, however, until the critical moment is reached for transferring transducer element 11 from one track to the next. At that point, solenoid 22 is activated to release the brake (lever arm 19) acting upon post 14. This permits spring 25 to quickly draw transducer 11 downwardly into contact with the next step 28 shown as e in FIG. 9.

It will be readily evident that there is no critical positioning of the cam steps relative to the bottom of post 14 other than to insure that when the cam member 27 is advanced, it is advanced only a single step at a time (in the preferred embodiment shown herein).

Thus, as disclosed above, the damping action of the felt washer 51 impregnated with a viscous damping fluid serves to apply a sufficient drag to the rotational movement of cam member 27 so as to prevent cam member 27 from being advanced more than one step at a time by the action of the ratchet.

From the foregoing, it is readily evident that there has been provided an improved transducer positioning means wherein the position of the transducer is dependent solely upon the thickness of the cam step disposed beneath the support post carrying the transducer element at any given time and that follower portion 14a will not be necessarily worn by being dragged across and down the edges of steps 28 which can be machined with great precision.

It will also be evident that a fine adjustment can be made so as to cause the transducer element to be directly centered on any given track to which it is associated simply by rotating the knurled knob 59 to operate eccentric 58.

Finally, it will also be evident that the construction is relatively simple whereby merely removing screw 41 permits the entire bottom portion of the equipment to be removed and replaced if desired.

I claim:

1. In a transducer positioning device for accurately moving a transducer to each of a plurality of discrete transducing positions on a record medium comprising a transducer support member for carrying a transducer to move from one of said positions to another, brake means operable to selectively grip or free said member, cam means having a plurality of discrete steps disposed to position said member, biasing means urging said member toward said steps to position said member and transducer relative to said positions on said record medium, and means for moving said steps out from under said member to form a gap therebetween while said brake member inhibits movement of said member toward said cam means whereby selective release of said brake means serves to permit said biasing means to move said member toward said step to translate said transducer to a related degree.

2. In a transducer positioning device for accurately moving a transducer to each of a plurality of discrete record tracks on a moving record medium comprising a transducer support member, cam follower means supporting said member for movement in response to movements of the follower means, a cam formed with discrete steps for positioning said follower means and said member to dispose the transducer at related tracks of said medium, bias means urging said follower means toward said steps, means for advancing said cam from one step to another, and means for locking said follower means against movement toward said cam while said cam advances to form a spacing between said cam follower means and said cam and for releasing said follower portion after completion of said advance to permit said bias means to move said follower to engage said cam.

3. In a transducer positioning device according to claim 2 comprising ratchet means for advancing said cam from one step to another, and viscous damping means serving to limit the advance of said cam to a predetermined degree.

4. In a transducer positioning device according to claim 2 further comprising means forming a fixed frame member, means carried by said frame member and movable relative thereto, the last named means carrying said cam, said transducer support member, and transducer, and means for adjusting the relative position of said last named means with respect to said frame member to align said transducer with said tracks.

5. In a transducer positioning device according to claim 4 wherein said means for adjusting includes means extending transversely of said last named means and an eccentric disposed to engage a portion thereof for moving said last named means.

6. A transducer positioning device for accurately moving a transducer to each of a plurality of discrete record tracks on a moving record medium and for registering the transducer with the tracks of the medium comprising a fixed frame member, a transducer support member carried by said frame member and movable relative thereto for positioning the transducer to each of a plurality of record tracks, cam follower means supporting said support member for movement in response to movements of said follower, a cam for positioning said follower and said support member, bias means urging said follower toward said cam, means carrying said cam and said transducer support member and transducer for movement thereof relative to said frame member to permit adjustment of the relative position thereof with respect to said frame member for aligning said transducer with said tracks, and means for advancing said cam to move said follower and support member to dispose the transducer from one track position to another.

7. A transducer positioning device for accurately moving a transducer to each of a plurality of discrete record tracks on a record medium comprising a fixed frame member, a transducer, a transducer support post for carrying said transducer thereon in transducing relation to the moving record medium, guide means comprising a bifurcated U-shaped bracket formed with aligned openings in the sides of the U, said post being disposed within said openings to extend between the sides of said U, clearance around said post within said openings sufficient to readily permit axial movement of said post therethrough, said bracket being disposed in fixed relation to said frame member, selectively operable brake means serving to selectively press said post against the sidewall of said openings to inhibit axial movement of the post, cam means having a plurality of discrete steps disposed to move in a predetermined path for engaging said post in cam following relation, means for advancing said steps along said path by discrete units and serving to move the steps out from under said post to form a gap therebetween while said brake inhibits axial movement of said post, biasing means urging said post toward said cam steps whereby selective release of said brake means after forming said gap serves to permit said biasing means to drive said post through said gap into registration with one of said steps so as to translate said transducer to a related degree.

8. In a positioning device for accurately moving a piece to each of a plurality of discrete positions comprising a support member for carrying said piece to move from one of said positions to another, brake means operable to selectively grip or free said support member, biasing means urging said member to move in a given direction to position said member and piece at one of said positions, and means for successively forming gaps of predetermined displacement between a portion of said support member and a registration surface spaced therefrom while maintaining said brake means operable to grip said support member to retain said support member against the urging of said biasing means, and means for selectively freeing the grip of said brake means on said support member to permit said biasing means to urge said support member to move into engagement with a said registration surface.

* * * * *